United States Patent [19]

Johnston et al.

[11] Patent Number: 4,976,587
[45] Date of Patent: Dec. 11, 1990

[54] COMPOSITE WIND TURBINE ROTOR BLADE AND METHOD FOR MAKING SAME

[75] Inventors: J. Ford Johnston, Sunland; William A. Farone, Irvine; Amir Mikhail, Northridge, all of Calif.

[73] Assignee: DWR Wind Technologies Inc., San Francisco, Calif.

[21] Appl. No.: 221,897

[22] Filed: Jul. 20, 1988

[51] Int. Cl.$^5$ ............................................. F01D 5/14
[52] U.S. Cl. ..................................... 416/230; 416/226; 416/239
[58] Field of Search ................. 416/223 R, 224, 226, 416/229 R, 229 A, 230, 239, DIG. 2, DIG. 5; 264/258; 156/157, 159

[56] References Cited

U.S. PATENT DOCUMENTS

| 2,465,007 | 3/1949 | Bragdon et al. | 416/229 |
| 2,754,915 | 7/1956 | Echeverria, Jr. | 416/226 |
| 3,028,292 | 4/1962 | Hinds | 416/226 |
| 3,349,157 | 10/1967 | Parsons | 416/230 A |
| 3,390,393 | 6/1968 | Upton | 416/226 |
| 3,586,460 | 6/1971 | Toner | 416/230 A |
| 3,967,996 | 7/1976 | Kamov et al. | 416/229 R |
| 4,260,332 | 4/1981 | Weingart et al. | 416/230 |
| 4,295,790 | 10/1981 | Eggert, Jr. | 416/226 |
| 4,392,781 | 7/1983 | Mouille et al. | 416/DIG. 2 |
| 4,411,598 | 10/1983 | Okada | 416/DIG. 2 |
| 4,668,169 | 5/1987 | Perry | 416/223 R |
| 4,728,263 | 3/1988 | Basso | 416/226 |
| 4,806,077 | 2/1989 | Bost | 416/229 R |

Primary Examiner—Robert E. Garrett
Assistant Examiner—John T. Kwon
Attorney, Agent, or Firm—Gottlieb, Rackman & Reisman

[57] ABSTRACT

A wind turbine rotor blade including NASA LS (1) - 04xx airfoil sections having a twist not greater than 8° and a construction for such a blade which includes no parting line along the leading edge. The bond between a rectangular spar and the outer skin is reinforced by channels of "C" shaped cross section affixed to the skin and the spar. A method for manufacturing a rotor blade of this construction.

49 Claims, 12 Drawing Sheets

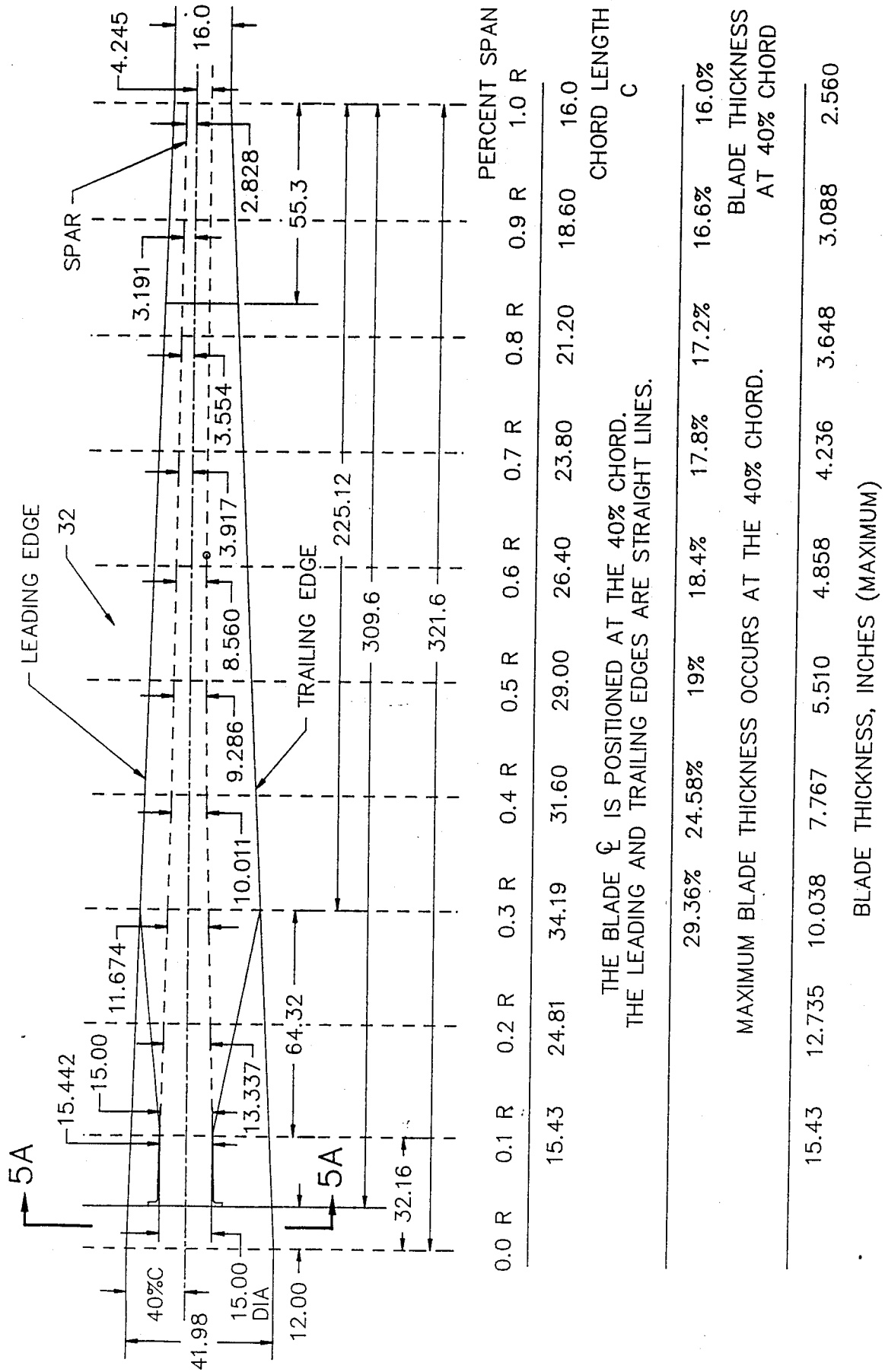

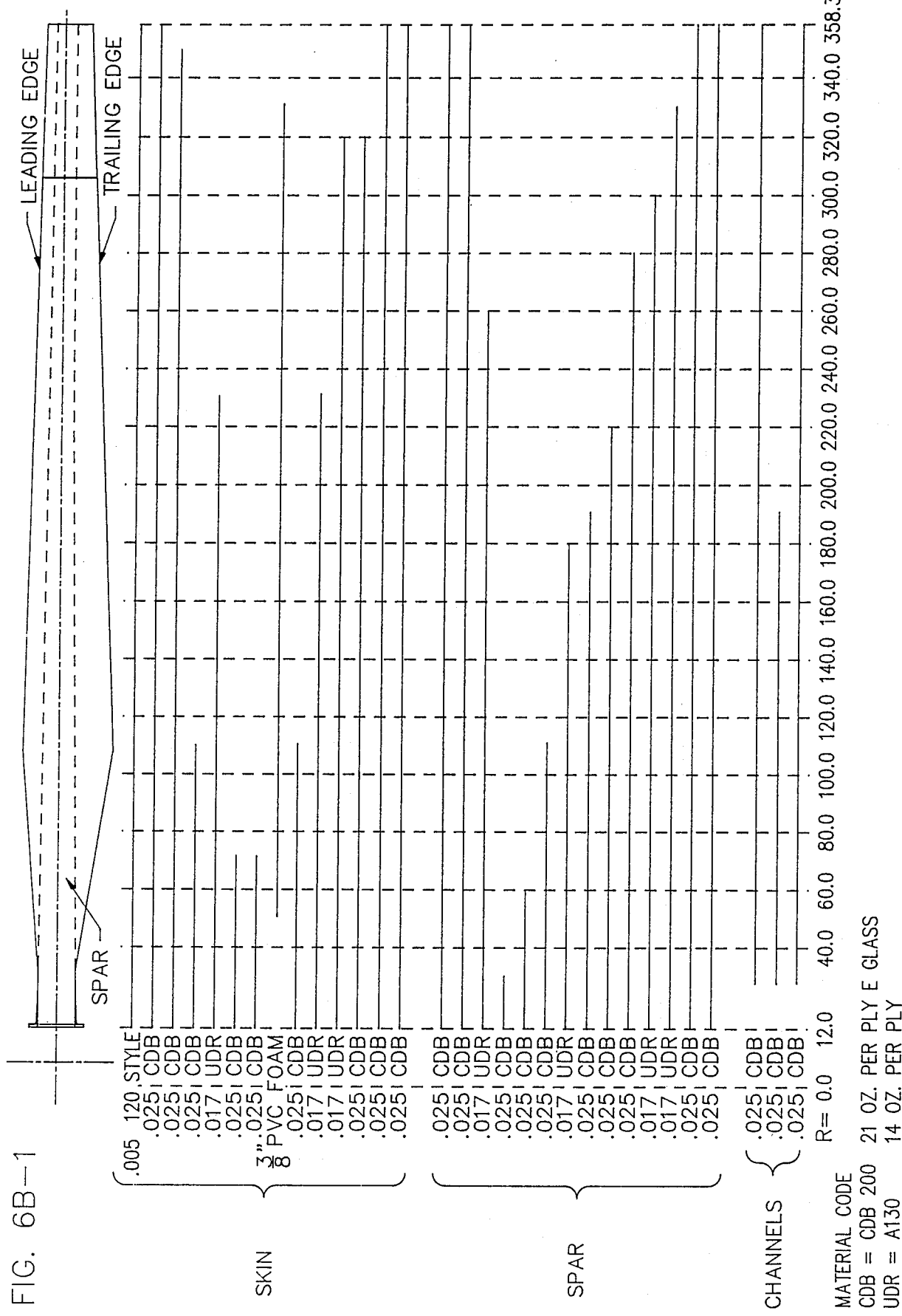

NOTES:

1. FOR ALL CHORDWISE SPLICES, BUTT SPLICES ARE NEVER PERMITTED. LAP SPLICES ARE PERMITTED IN EXTERIOR SPLICES.

2. FOR ALL SPANWISE SPLICES, BUTT SPLICES ARE ALLOWED ONLY WITH A 130 MATERIAL. LAP SPLICES ARE ONLY PERMITTED WHEN USING CDB 200 MATERIAL.

3. AT ROOT TUBE WIDTH OF UDR IN SKIN & SPAR IS FULL CIRCUMFERENCE. WIDTH TAPERS LINERLY TO R=107.49

FIG. 6B-2

NOTES:

1. FOR ALL CHORDWISE SPLICES, BUTT SPLICES ARE NEVER PERMITTED. LAP SPLICES ARE PERMITTED IN EXTERIOR SPLICES.

2. FOR ALL SPANWISE SPLICES, BUTT SPLICES ARE ALLOWED ONLY WITH A 130 MATERIAL. LAP SPLICES ARE ONLY PERMITTED WHEN USING CDB 200 MATERIAL.

3. AT ROOT TUBE WIDTH OF UDR IN SKIN & SPAR IS FULL CIRCUMFERENCE. WIDTH TAPERS LINERLY TO R=107.49

FIG. 6D-2

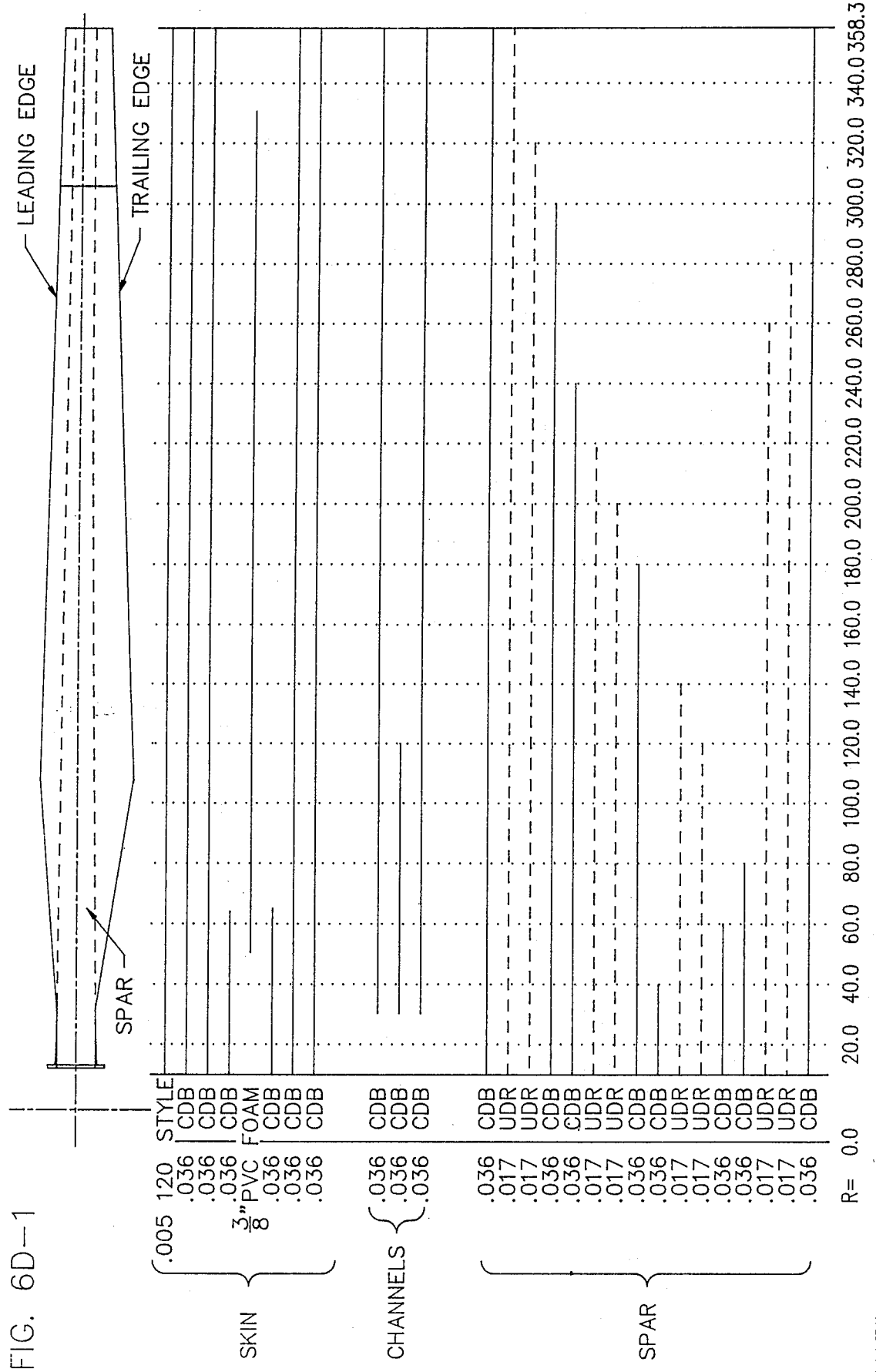

COMPOSITE WIND TURBINE ROTOR BLADE AND METHOD FOR MAKING SAME

TECHNICAL FIELD

This invention relates generally to wind turbine rotor blades. More particularly, this invention relates to wind turbine rotor blades manufactured from composite materials, and to a method for manufacturing such rotor blades.

BACKGROUND ART

In recent years, it has become apparent that conventional methods of generating electricity will soon be insufficient to meet the world's ever-growing need for electric power. Several factors, including the pollution which results from the combustion of fossil fuels, the dangers associated with the operation of nuclear reactors, and the limitations inherent in the traditional hydroelectric as well as in the more modern solar energy approaches to the generation of electricity, have encouraged the development of alternative sources of electric power, such as the wind turbine generator.

Wind turbines convert wind energy to electrical energy in a manner analogous to the way in which the windmills of Western Europe converted wind energy to mechanical energy for pumping water or operating grinding mills. A wind turbine generally includes a rotor which is mounted for rotation near the apex of a tower approximately 18 to 50 meters in height. The rotor acts as the prime mover for an electrical generator which provides power through transformers and substation controlled connections, to the local utility power grid.

Generally, wind energy projects include the installation of large numbers of wind turbine generating systems at locations having favorable wind conditions. Several of these so-called "wind farms" are located in the state of California.

In late 1986 it became apparent that the various wind energy projects using wind turbines to generate electrical energy suffered from a major problem in that the turbines were not receiving the amount of wind energy that was projected based on the initial wind studies that were conducted. There have been many reasons advanced for this shortfall of wind energy. Little can be done about the wind itself, with the exception of understanding the available resource better (by using direct measurement and analysis). However, new rotor blades, designed to take better advantage of the available wind resource, provide an opportunity for energy increase.

Another major problem which has been associated with wind energy projects is mechanical failure in existing wind turbines. It has been found that the direction of the wind is not always along the rotational axis of the rotor. Off-axis wind components cause mechanical loads on the blades that were not adequately considered when the original blades were designed. Particularly, when the wind rises along a slope to a wind turbine placed at the top of the slope, it creates an additional "yawing" (side to side) load. This is sometimes called "vertical flow." When the wind comes in from either side ("yawed flow") it creates an additional "pitching" load (bottom to top or top to bottom, depending on the yawed flow direction). Although the wind turbines have "active yaw systems" which are designed to rotate in response to changes in wind direction so that the rotor always faces the direction from which the wind is blowing, it has been found in practice that the rate of yaw rotation is slow compared to the rapid and variable changes in wind direction which are common in nature. These additional loads are causing major damage in turbine systems in areas such as California.

A factor contributing to mechanical failure of existing wind turbine blades is that the aerodynamic loads, which begin at the tip, are integrated along the length of the blade. Therefore, longer blades (especially those producing more energy due to increased airfoil efficiency) will have higher loads at the base or root, thus making the design of the structure more critical.

Another major problem associated with existing wind turbine blades is leading and trailing edge cracking. In prior designs the top half of the blade is formed in one mold, while the bottom half is formed in another mold. Then, both halfs are sealed to a spar. Alternatively, the skin is "hinged" either fore or aft. Defects in the leading edge can ruin airfoil efficiency. Such defects are more likely to occur along a joint between separately molded parts, and may occur either during manufacture or during continued use. It is often necessary to rework or make "repairs" to newly manufactured parts, or to replace blades in the field due to premature failures.

One prior approach to increasing energy output is simply to increase the swept area through the use of devices called "hub extenders." These devices fit between the base of the existing blades and the hub, thus increasing the length of the blades and therefore the swept area. However, these devices increase the total weight of the rotor system, increase aerodynamic and gravity loads on the mechanical components of the wind turbine and also require a double set of attachment bolts, thus introducing another point of potential component failure.

The Vestas V-15 and Vestas V-17 wind turbine generators are found at various wind farm sites in California. These machines are typical of the Danish turbines used in many wind energy projects Both of these machines are three blade, upwind, active yaw (turning into the wind) machines running nearly synchronously at approximately 51 rpm. The V-15 has a 75kw electric induction generator (nameplate 65kw) and the V-17 has a 110kw generator (nameplate 90kw). The V15 uses 7.5M blades of a basic NACA 44xx airfoil series and the V-17 uses 8.5M blades of the same series. The average thickness-to-chord ratio for the series used is approximately 0.18 and thus the typical airfoil cross section is an NACA4418. The existing blades are highly twisted, with the twist changing by about 18° from root to tip. In use, these NACA 4418 blades are also subject to considerable fouling by dirt and insect debris which reduce operating efficiency and make frequent washing a necessity. The blades also weigh on the order of 1,000–1,200 pounds each, which is considered excessive for their function by modern technology standards. These blades, or very similar designs, are used in thousands of turbines installed in California.

DISCLOSURE OF THE INVENTION

It is the principal object of the present invention to provide a wind turbine rotor blade which may be used to generate increased power at relatively low wind speeds.

It is another object of the invention to provide a wind turbine blade which reduces turbine loads, particularly with regard to off-axis winds.

It is still another object of the invention to provide a wind turbine blade with increased structural integrity and which has a reduced chance of catastrophic failure over a lifetime measured in decades.

It is an additional object of the invention to provide a wind turbine blade that is not subject to the development of leading edge defects which decrease airfoil efficiency.

It is yet a further object of the invention to provide a wind turbine blade which maintains its efficiency when dirt and insect debris are deposited on the blade.

It is still another object of the invention to provide a wind turbine blade and a method of manufacturing the same which is low in cost.

In accordance with the invention, a wind turbine rotor blade is formed with LS(1) - 04xx airfoil sections. The turbine blade has a thickness-to-chord ratio of substantially sixteen percent at full radius This ratio increases to substantially nineteen percent at one half full radius and substantially twenty-nine percent at three tenths full radius. Preferably, the thickness-to-chord ratio at three tenths full radius is 29.4%, and the blade thickness is maximum at a 40% chord. The rotor has a twist equal to zero from full radius to 50% full radius, but the twist then increases to a value of not more than 8 degrees at the theoretical hub of the rotor blade. Preferably, the chord length increases linearly from full radius to three tenths full radius. The chord length then decreases from three tenths full radius toward the hub. The leading edge and the trailing edge of the blade are preferably both substantially linear. The shape of the blade changes from an airfoil section to a circular tube extending longitudinally of the blade inward from three tenths of full radius. A tubular section is used to connect the blade to the rotor hub.

Also in accordance with the invention, a wind turbine rotor blade has an outer skin of fiberglass mat impregnated with a polymer resin. The rotor blade encloses a spar extending longitudinally in the rotor blade. The spar has a substantially rectangular cross-section having a first side in contact with a first inner surface of the skin and a second side in contact with a second inner surface of the skin. A third side and a fourth side of the rectangular spar extend substantially perpendicularly to the inner surfaces of the skin and connect the first and second sides of the spar.

The rotor blade also encloses two longitudinally extending channels adjacent the spar. A first channel has a first wall extending parallel to the third side of the spar and affixed thereto, a second wall extending parallel to the first inner surface of the skin and affixed thereto, and a third wall extending parallel to the second inner surface of the skin and affixed thereto. A second channel has a first wall extending parallel to the fourth side of the spar and is affixed thereto. A second wall of the second channel extends parallel to the first inner surface of the skin and is affixed thereto. A third wall of the second channel extends parallel to the second inner surface of the skin and is affixed thereto. The second and third walls of each channel extend along the inner surface of the skin in a direction away from the spar. The first and second channels are preferably "C" channels. The open end of the forward channel faces the leading edge of the blade, while the open end of the aft channel faces the trailing edge of the blade.

Further, in accordance with the invention a wind turbine rotor blade includes a leading edge assembly formed of layers of fiberglass impregnated with a polymer resin. The leading edge assembly has a closed leading edge and rear edges defining an open rear. Several of the layers extend short of the rear edges so that the thickness of the skin is reduced in first attachment regions adjacent the rear edges. The rotor blade also includes a trailing edge assembly, also formed of layers of fiberglass, impregnated with a polymer resin. The trailing edge assembly has a closed trailing edge and front edges defining an open front. Several of the layers extend short of the front edges so that the thickness of the skin is reduced in second attachment regions adjacent the front edges. The first attachment regions and the second attachment regions are of complementary shape. The first attachment regions are of a thickness sufficient to receive the reduced thickness of skin in the second attachment regions.

In accordance with the preferred embodiment, the inner layers of the leading edge assembly extend short of the rear edges, while the outer layers of the trailing edge assembly extend short of the front edges. The first wall of the spar is affixed to the inner surfaces of both the leading edge assembly and the trailing edge assembly so as to span upper attachment regions and lower attachment regions. Preferably, polymer foam stiffening inserts extending longitudinally in the trailing edge assembly increase stiffness so that the blade maintains camber under load. The stiffening inserts are inserted between two of the layers of the trailing edge assembly, i.e., the layers are separated to define a channel for receiving each stiffening insert. Preferably, one insert is disposed in a first wall of the trailing edge assembly and a second insert is disposed in a second wall of the trailing edge assembly.

In accordance with the method of the invention a composite blade for a wind turbine is constructed by inserting first plies of fibrous material impregnated with a polymer resin into a first mold. The first mold is shaped to define the trailing edge assembly of the blade. Second plies of a fibrous material impregnated with a polymer resin are then wrapped around a mandrel. The mandrel is sized and shaped to define a spar member to extend longitudinally within the blade. Third plies of the fibrous material impregnated with the polymer resin are then inserted into a second mold. The second mold is sized and shaped to define the leading edge assembly of the blade. The first mold, the second mold and the mandrel are then aligned so that the mandrel wrapped with the second plies to define the spar member is disposed internally between the leading edge assembly and the trailing edge assembly, and so that the leading edge assembly and the trailing edge assembly are aligned to define the blade. The polymer resin is then cured.

Preferably, the mandrel is positioned so that plies on the external surface of the mandrel are in contact with plies on the internal surfaces of both the leading edge assembly and the trailing edge assembly.

The method further comprises the step of sizing the first plies and the third plies so that selected first plies extend short of the rear edges of the leading edge assembly and so that selected third plies extend short of the front edges of the trailing edge assembly, thereby defining corresponding joining regions in the leading edge assembly and the trailing edge assembly. During the step of aligning the first mold and the second mold, the corresponding joining regions contact one another. The mandrel is positioned so that plies on the external surfaces of the mandrel contact the plies on the internal surfaces of both the leading edge assembly and the trailing edge assembly at least at the joining regions.

BRIEF DESCRIPTION OF THE DRAWINGS

Further objects, features and advantages of our invention will become apparent upon consideration of the following detailed description in connection with the drawings in which:

FIG. 4A and FIG. 4B are detailed dimensioned drawings showing plan, chord length and thickness for an 8.2 meter blade and 9.1. meter blade, respectively, in accordance with the invention;

FIG. 6A and FIG. 6B are respective laminate schedules for the 8.2 meter and 9.1 meter blades in accordance with the invention; FIG. 6B-2 contains notes associated with FIG. 6B-1;

FIG. 6C and FIG. 6D-1 are respective laminate schedules, using a different material, for the 8.2 meter and 9.1 meter blades in accordance with the invention; FIG. 6D-2 contains notes associated with FIG. 6D-1;

FIG. 8 to FIG. 12 are schematic representations of the ply lay-up arrangements used in the blade according to the invention, represented in FIG. 2 and FIG. 3.

DETAILED DESCRIPTION OF THE PREFERRED EMBODIMENTS

The present invention is described below with reference to two different sizes of blades, each of which may be used in sets to make up the rotor of a wind turbine. However, it will be understood that the principles of the invention may be applied to other blade sizes used for different generators. In general, the length of the blade is chosen so that the maximum aerodynamic power corresponds to the maximum power rating of the generator (allowing for mechanical to electrical conversion losses) used in the wind turbine.

Figure 1:
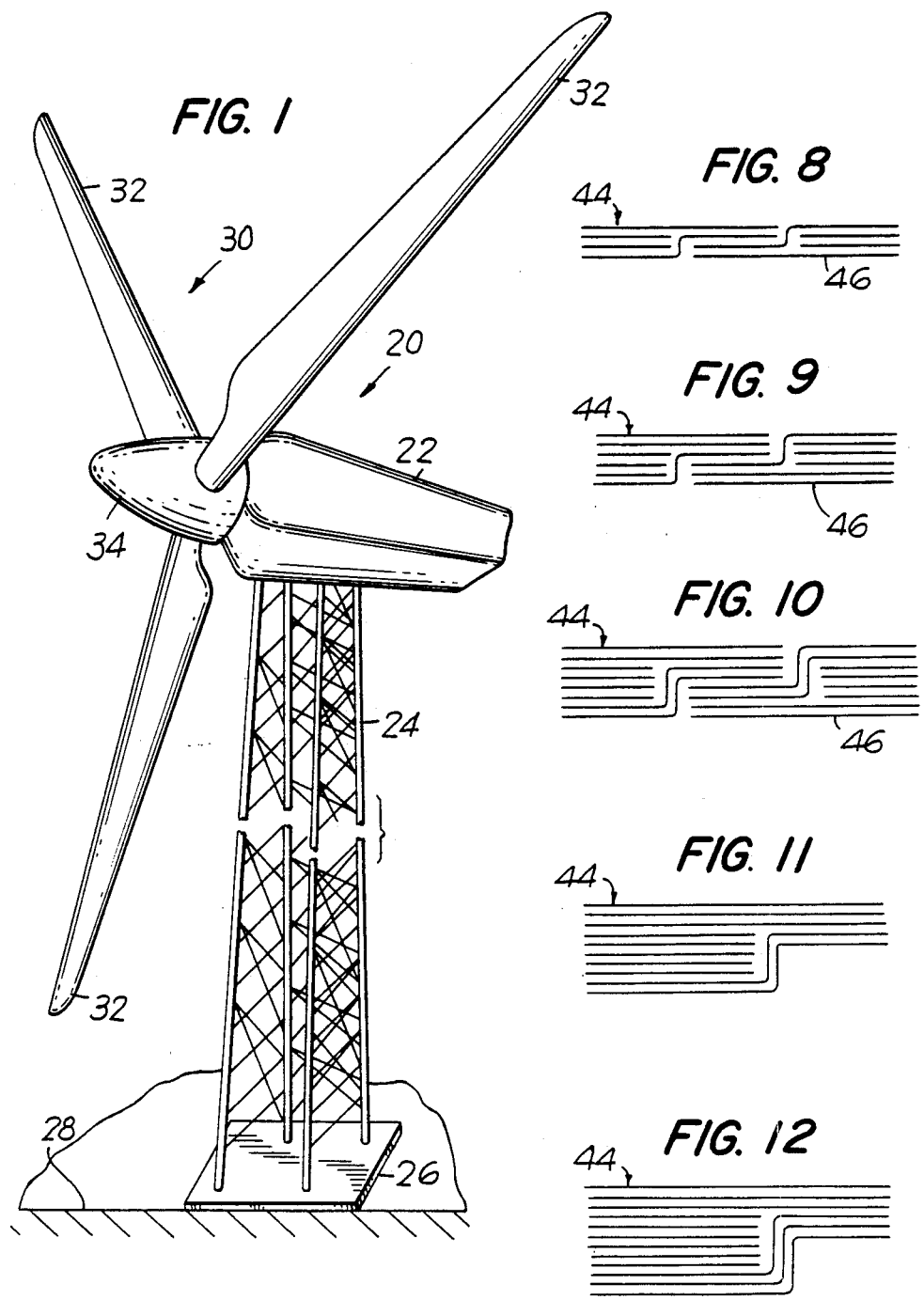
FIG. 1 is a perspective view of a wind turbine generator having a rotor utilizing three turbine blades in accordance with the present invention.

Referring to FIG. 1, a wind turbine generating system 20 includes a generator housing assembly 22 supported atop a tower 24. Tower 24 is affixed to a base 26 which is firmly secured to the surface of the earth 28. Guywires (not shown) may extend from tower 24 to fixtures (not shown) in the earth 28 so as to secure tower 24 against lateral loads.

System 20 includes a turbine rotor 30 having three blades 32 affixed to a central hub (not shown in FIG. 1) beneath a cone 34. The hub of rotor 30 is affixed to a shaft (not shown) extending longitudinally in housing 22 (perpendicular to the plane of blades 32). As is well known in the art, housing 22 typically includes a gear box for increasing the speed of revolution of the generator drive relative to that of the shaft; a three phase induction generator powered by the output of the gear box which supplies electric power to the local utility power grid; a semi-active yaw drive control system which causes the rotor to face into the wind; and normal speed and emergency braking systems for quickly bringing the spinning rotor to a stop should an overspeed condition occur. Typically, an anemometer (not shown) mounted atop housing 22 monitors wind speed so that under severe wind conditions which could cause damage to the rotor blades or wind turbine system, the housing 22 is turned so that rotor 30 is parallel to the wind, thus decreasing loads on the blades and the other components within housing 22.

AIRFOIL DESIGN

Since, in many locations, there are more hours of moderate wind speeds (i.e., 20–30 mph) and fewer hours of high wind speeds (i.e., over 30 mph), the basic concept utilized in the present invention is to increase the swept area of the blades (by using longer blades), which allows for greater energy capture in a purely physical way. It is not at all obvious, however, that one can actually do this, because longer blades may increase mechanical loads on the turbine to unacceptable levels, may be prohibitively expensive, and may also have shorter expected lifetimes than the shorter blades.

Generally, in replacing a turbine blade with one of a new design, the external features of the blade which can be varied to control the aerodynamic characteristics and thus the mechanical results include the following design parameters:

1. Blade length;
2. Aspect ratio (i.e., the length of the chord compared to the length of the blade at each position along the blade);
3. Thickness-to-chord ratio (i.e., the exact size of the airfoil section at each position along the length of the blade); and
4. Blade twist.

Various airfoil shapes are generally considered for any given application. It was initially determined that the best airfoil shape for reduced sensitivity to dirt and debris is the NASA LS(1) profile, which has the highest efficiency based on the ratio of the coefficient of lift to the coefficient of drag of all presently available airfoil shapes.

In addition to determining the appropriate airfoil shape to meet the objective of increased power, it is necessary to evaluate the economics and internal structure of the blade to be produced in accordance with the external aerodynamic parameters.

It was determined that lengths of 8.2M for the V-15 turbine (which currently has a 7.5M blade) and 9.1M for the V-17 turbine (which currently has a 8.5M blade) were the maximum practical lengths to stay within the design parameters. The size of the root attachment of the V-15 turbine is actually larger than that used on the V-17 machine so that even though the V-15 blade is shorter, care must be taken to provide a uniform transition in loads along the blade.

It was found that the thickness of the airfoil compared to the length of the chord should average about 17% or less along the outboard 50% of the blade where most of the power is produced The range of this parameter is from 15% at the tip to 19% at the midpoint of the span of the blade, with 16% to 19% being the preferred range of this parameter along the span of the blade to allow for a smooth transfer, to the root of the blade, of the bending moments and other loads. This is important because these blades have steel roots which have been proven to confer superior blade longevity as compared with blades having plastic roots reinforced with fiberglass or fiberglass roots reinforced with steel. The success of steel roots is dependent on transferring operating loads on the blades uniformly from the glass-resin portion of the blade to the steel root and cuff area. The outboard airfoil shape as well as the taper in the transition region, and the avoidance of any sharp edges or transitions, allows these loads to be transferred uniformly.

Figure 4B:
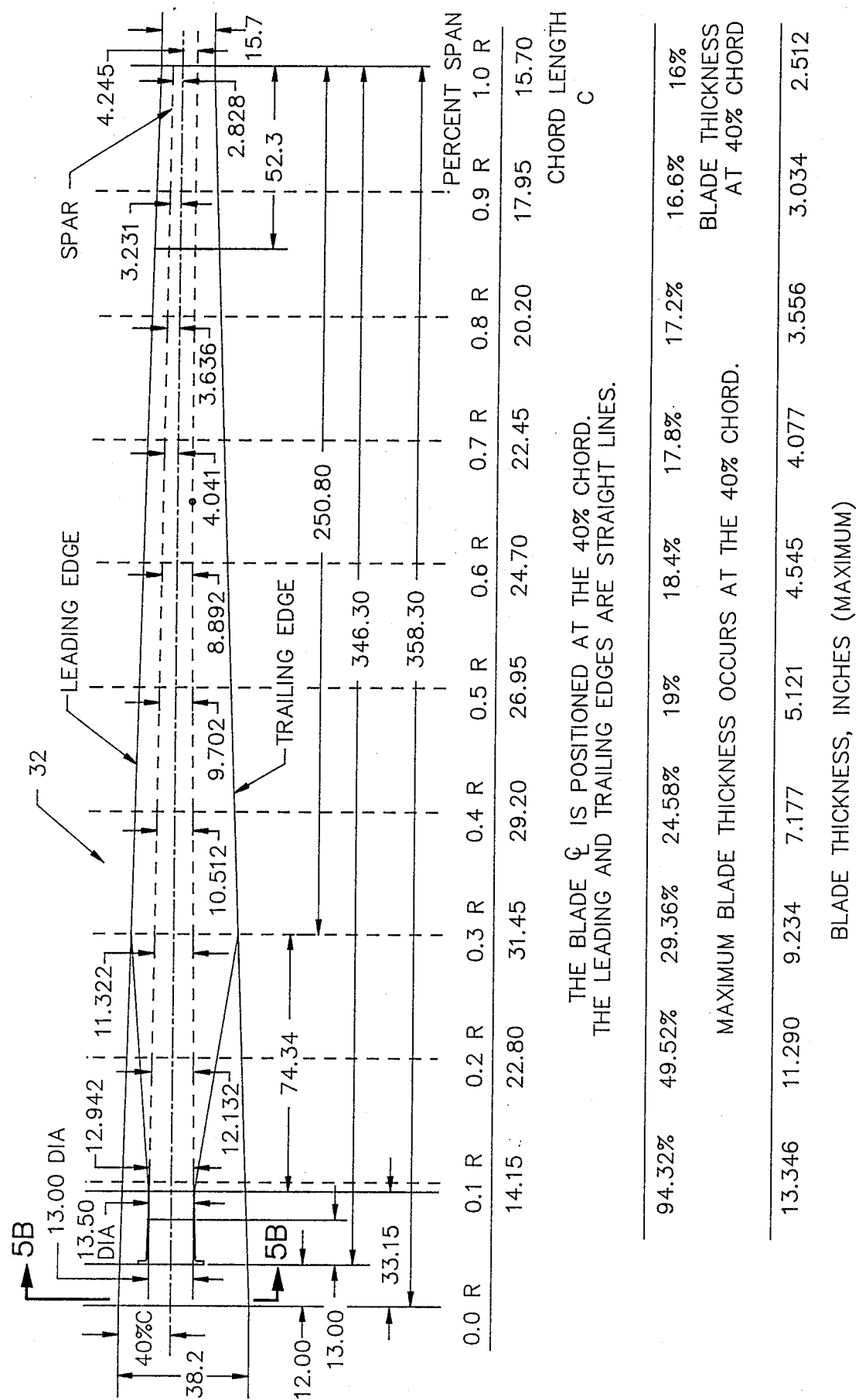

An important and surprising design determination is that the new blades should be only approximately 70% as wide as the existing blades. The precise chord lengths which are best for each design are set forth in detail in FIG. 4A for the 8.2 M blade and in FIG. 4B for the 9.1 M blade. As illustrated in FIG. 4A and FIG. 4B, the blade centerline is positioned at the forty percent chord, where the blade is at maximum thickness. The actual maximum blade thickness, as a function of radius, is also shown in FIG. 4A and FIG. 4B. The leading and trailing edges describe straight lines to simplify blade construction, i.e., the blade has a linear taper. The slight advantages which may be conferred by using designs other than a straight line design are more than offset by additional blade construction costs due to more expensive molds, the need for more careful lay-up of the fiberglass and difficulties in maintaining good structural characteristics including adequate bonding and proper tolerances during the manufacturing process.

If the leading and trailing edges were extended inward to the center of rotation of the rotor (the theoretical hub), the chord lengths would be 38.2 inches (0.970 M) for the 9.1 M blade and 41.98 inches (1.066 M) for the 8.2 M blade. However, in accordance with the invention the shape is changed, from thirty percent of full radius inward, from an airfoil to a tube of circular configuration which fits into a hub connection sleeve as described below. Blade length is measured from the tip to the theoretical hub.

It has also been found that an 8° twist is the maximum that can be accepted to meet the objective of reducing the off-axis loads. Twist provides a means for allowing different portions of the blade to stall at different wind speeds due to the differing angle of attack of the wind to the blade. High twist has been used to allow the outboard sections of the blade to stall before the inboard sections, with the stalled sections "moving" inboard (i.e., extending over a larger portion of the blade length) as the wind speed increases. Unfortunately, this concept has the disadvantage that the blade will not respond to sudden changes in wind speed due to the gradual stall characteristic, and harmful overspeed conditions may occur. Another disadvantage is that off-axis winds can exert more force on highly twisted blades. It has been determined that the higher efficiency of the LS(1) airfoil permits high power output to be retained without the need for high twist. A further advantage of using low twist is that the molds for the production of the composite blades are less expensive to build, the parts may be more easily removed from the mold, and the parts are less subject to errors in size and shape.

Figure 5A:
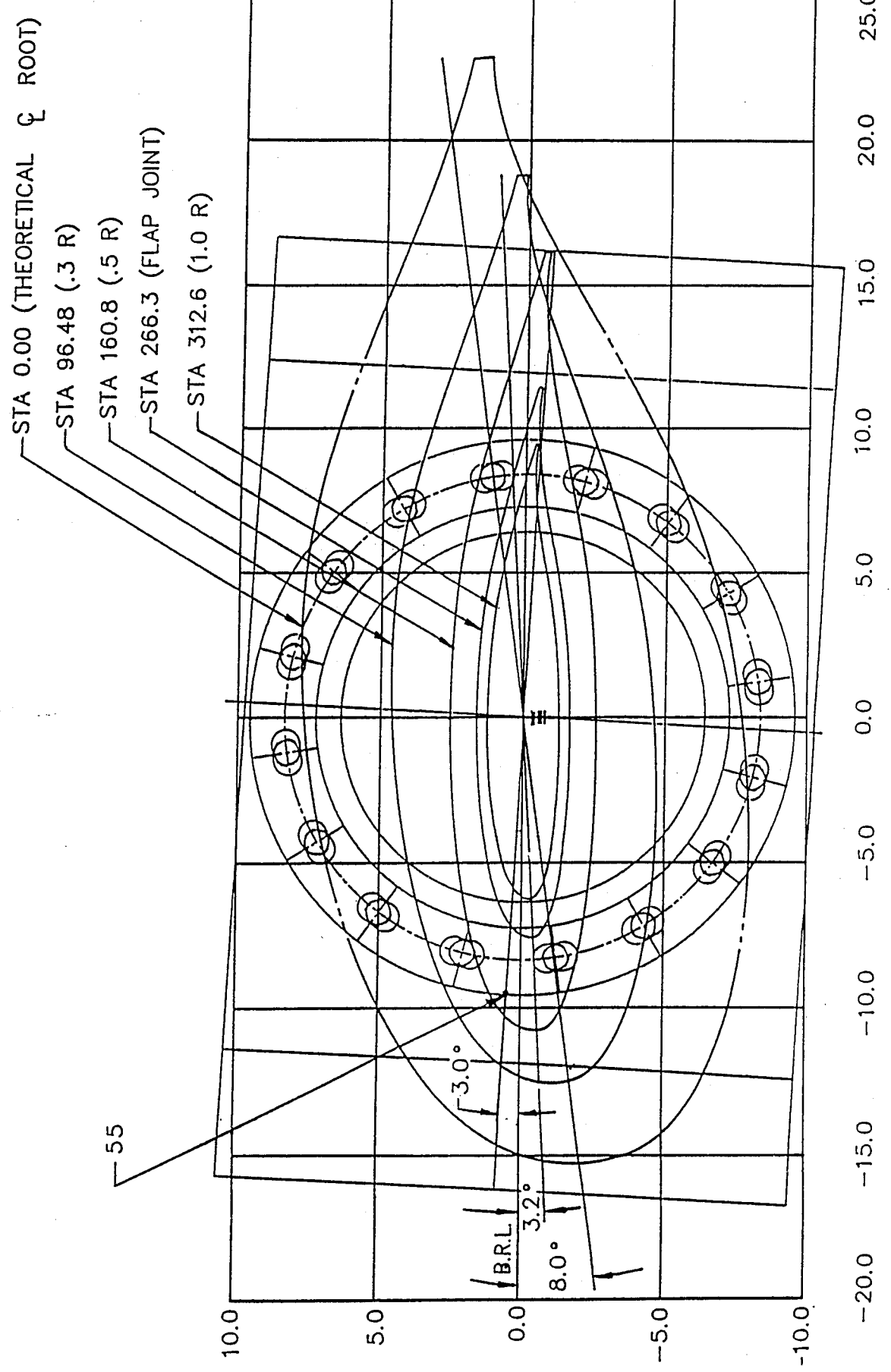
FIG. 5A and FIG. 5B are schematic views in the direction of lines 5A—5A and 5B—5B, of FIG. 4A and FIG. 4B respectively, which represent the twist of an 8.2 meter blade and a 9.1 meter blade, respectively, of the invention.
Figure 5B:
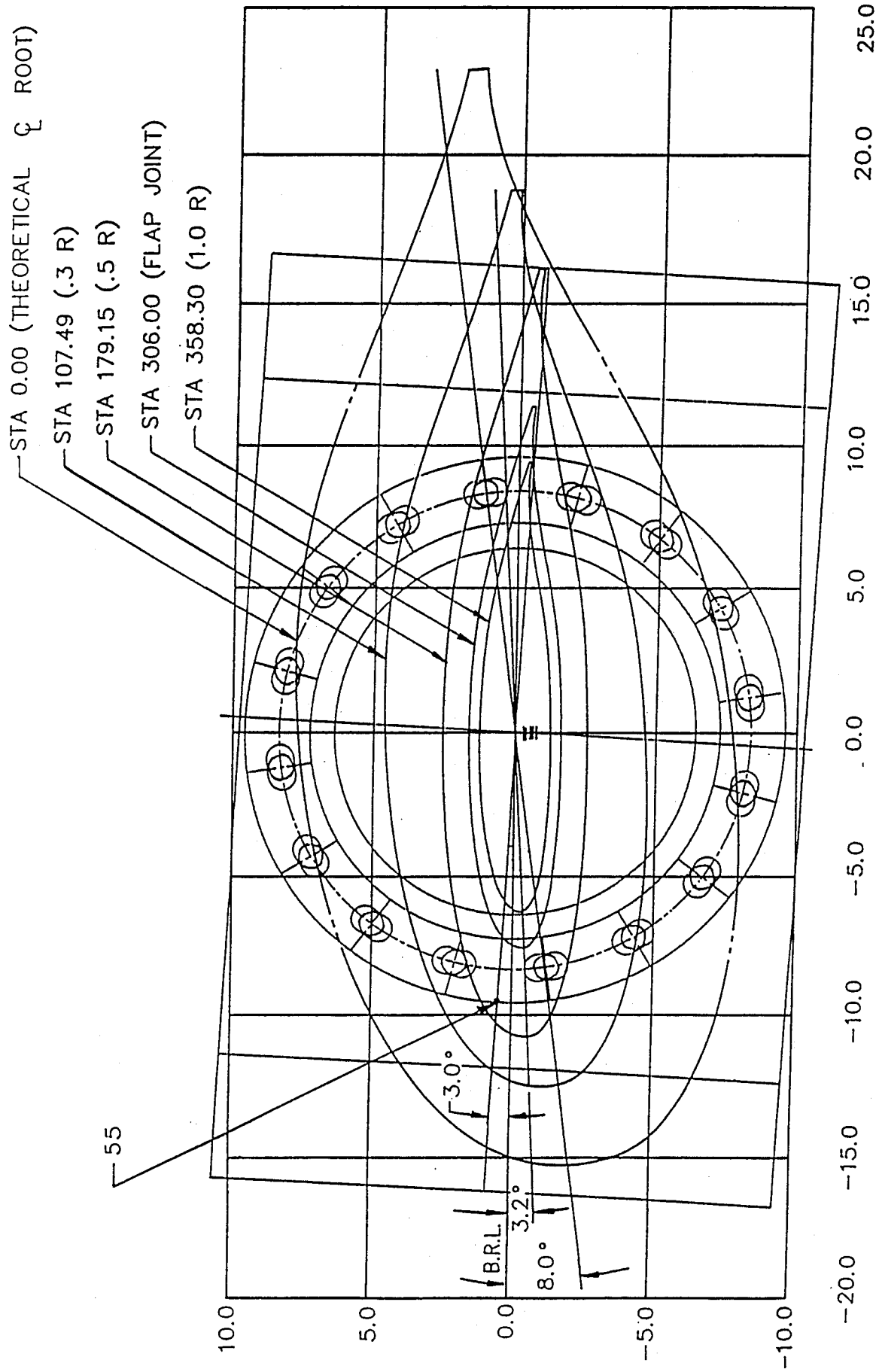

The twist of the 8.2 M blade and the 9.1 M blade of the present invention are represented, up to the theoretical hub, in FIGS. 5A and 5B, respectively. As illustrated therein, the rotor blade is twisted linearly from the theoretical hub to the fifty percent radius station. There is no twist from the fifty percent radius station to full radius. FIG. 5A and FIG. 5B also illustrate the rotational relationship of the blades and a flange 54 used for connection to the rotor hub, as more fully described below. Each flange 54 has a notch 55 to facilitate proper rotational alignment of flange 54 and its respective blade.

The precise coordinates for construction of the 8.2 M and 9.1 M blades according to the invention are set forth in Tables IA, IB and IC. The actual thickness values as a function of chord station, from leading edge at 0.0 to trailing edge at 1.0000 for type LS(1)-0413, LS(1)-0417 and LS(1)-0421 airfoils are set forth in tables IA, IB and IC, respectively. It will be understood by one skilled in the art that the actual coordinate values at any station may be determined by interpolating, using a standard procedure, between the values in these three tables, which are for thickness-to-chord ratios of 13%, 17% and 21% respectively.

The projected power curves of the blades constructed in accordance with the invention, when applied to the wind speed distributions present at the locations of existing wind energy projects, show power increases ranging from 26% to 42% above prior art blade configurations.

BLADE CONSTRUCTION

The construction of the blades must also meet objectives with regard to blade durability, quality and cost. The use of GRP (glass reinforced polymer), with both bidirectional and unidirectional fibers in the mat, is critical because unidirectional mat alone or filament wound sections do not provide as much strength per unit weight in directions perpendicular to the direction of the fibers. The use of bidirectional fiber mat allows a reduction in weight while maintaining strength.

Blades are designed to weigh between 450 and 600 pounds when fully assembled with flaps or other selected speed control devices. In addition, the center of gravity must be within one inch of the calculated design location so that the blades will be very closely balanced as built.

Figure 2:
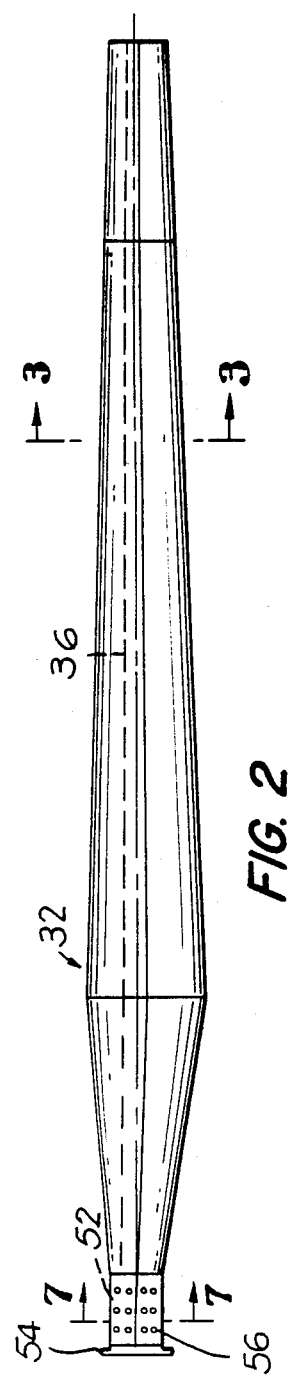
FIG. 2 is a plan view of one of the rotor blades in accordance with the invention.
Figure 3:
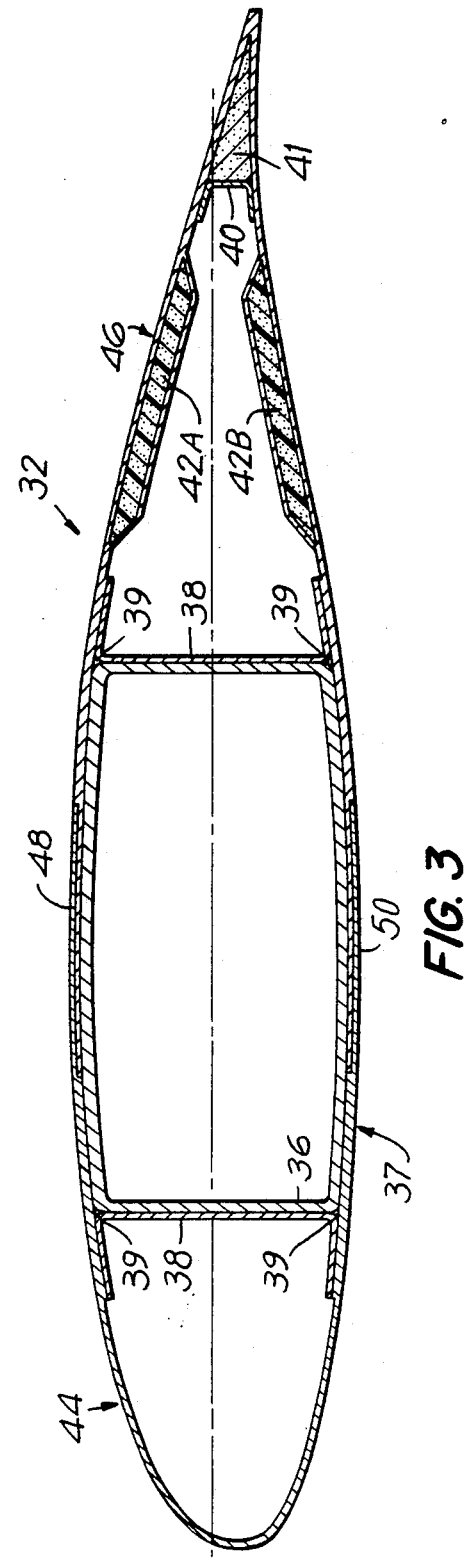
FIG. 3 is a cross-section view taken along line 3—3 of FIG. 2.

Referring to FIG. 2 and FIG. 3, the blade uses a box spar 36 internal to the blade which can accept loads in all directions (as opposed to I-Beam spars which accept loads from top to bottom better than from side to side). Blades have been failing in the field due to gravity loads from leading to trailing edge. This problem is overcome by using a box spar, which can support these gravitationally induced rotational loads.

To be certain that the high temperature resin, used for increased stability in the hot desert sun, is uniformly distributed at the critical points where the box spar bonds to the outer wall or skin 37 of blade 32, two "C" channels 38 are used running the span of the blade. This quality control feature assures that cracks will not start and propagate between spar 36 and outer skin 37. Small cusp shaped spaces 39, which run along the span of blade 32, are filled with polymer resin.

As noted above, in the field, existing blade designs are often subject to cracking on the leading and trailing edges. The design of the present invention solves that problem by utilizing either of two manners of construction. The practice used in prior designs of building the top half of the blade in one mold and the bottom half in another and then sealing them to a spar is avoided. Instead, there is no break in the material at the critical leading edge, where any defect can decrease airfoil efficiency. The blade is built in two sections which represent the leading edge half of the blade and the trailing edge half of the blade. These sections are then sealed along the span of the blade adjacent the top and bottom walls of the box spar. Alternatively the entire skin may be built as a "clam shell" which opens at the trailing edge to allow insertion of the spar and other internal components. Of these modes of fabrication, the two section approach (front and back halves) is preferred and utilized, due to ease of fabrication and the absence of a trailing edge opening. In either case, a "C" shaped member or "dam" 40 (see FIG. 3) is placed inside of the trailing edge to confer extra stiffness and to prevent trailing edge cracking. A resin filler 41 contributes to stiffness by occupying the internal volume of blade 32 between dam 40 and the trailing edge.

An additional design nuance is the addition of lengthwise stiffeners 42A and 42B in the trailing edge section of the blade to help the blade retain the critical "camber" in the shape that is characteristic of the LS(1) design. This camber contributes to the high efficiency of the blade and the stiffeners help to defeat any tendency for the airfoil shape to change over years of use. Stiffeners 42A and 42B are preferably formed of 0.125 inch thick PVC foam having a density of approximately 4.0 pounds per cubic foot.

Metal parts are integrated into the design of the invention so as to transfer all loads evenly and smoothly. This is particularly true in the root area where no sharp edges are used along the transition from GRP to metal. The prior art practice of using notches in the metal flange area to "hold" the GRP is undesirable, since the blade is subject to stress concentration at those points. If filament wound spars are used, this can accelerate fiber to fiber abrasion as the blade ages under continuous stress.

Spar 36 is preferably made of E-glass unidirectional fabric that is placed parallel to the spar axis. E-glass triaxial fabric is interspersed within the unidirectional fabric, as described herein below and as illustrated in FIGS. 6A, 6B, 6C and 6D. The unidirectional material provides the required bending stiffness and strength. Shear strength and torsional stiffness are obtained by use of the triaxial fabric.

The spar material may be CDB 200 having a weight of 20 ounces per square yard. It is triaxial (Knytex, E-glass) with a thickness of 0.025 inch per ply. The unidirectional fabric may be URD A130 having a weight of 14 ounces per square yard and a thickness of 0.017 inch per ply.

While there are several methods which may be used to produce a tubular composite spar, the preferred approach is to lay-up the spar on a rigid mandrel covered with a rubber bladder. After the lay-up is completed, the mandrel is transferred to a split female mold and the bladder pressurized with steam or heated oil. This technique produces high quality laminated tubes having the required outside dimensions and reduces process cycle times.

The fabrics selected for the blade do not require cross plying. All fabrics are laid-up parallel to the spanwise axis of the blade with a tolerance of ±5°. Longitudinal butt splices are permitted in the unidirectional material to obtain the required thicknesses. Butt splices in the chord-wise direction of the unidirectional material are not permitted. When laying up the triaxial CDB fabric, longitudinal lap splices, 2.0 inches long, are permitted.

It is preferred that resin impregnation machines, such as, for example, a Venus Impregnator, be used to obtain a uniformly wetout fabric with a resin content of 45% ±5% by weight.

The lay-up should be done in an area which is free from contamination. Proper precautions should be taken to assure that prior to use, all raw materials are stored according to the manufacturers' recommendations.

Figure 6A:
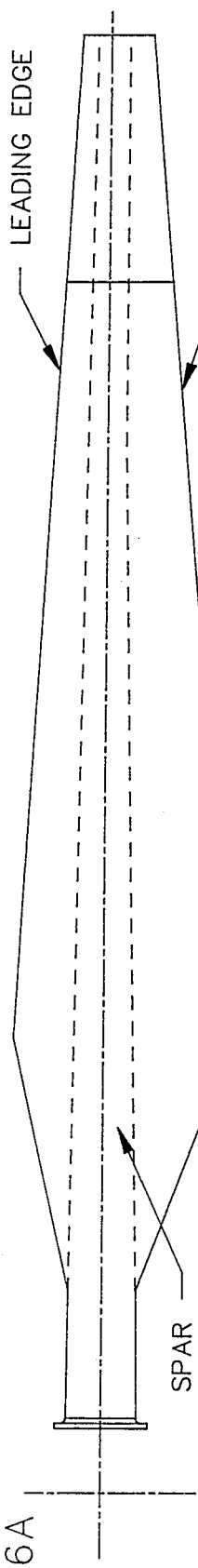

The preferred laminate schedules for the skin, spar and channel materials discussed hereinabove (including dam 40) for the 8.2M and 9.1M blades according to the invention are illustrated in FIG. 6A and FIG. 6B, respectively. The preferred spar thickness distribution resulting from this layup is set forth in Table II.

TABLE II

| | t spar (in.) | |
| Percent of Span | 8.2M Blade | 9.1M Blade |
| --- | --- | --- |
| 20 | 0.318 | 0.268 |
| 30 | 0.282 | 0.268 |
| 40 | 0.248 | 0.243 |
| 50 | 0.248 | 0.243 |
| 60 | 0.212 | 0.201 |
| 70 | 0.159 | 0.176 |
| 80 | 0.142 | 0.134 |
| 90 | 0.125 | 0.117 |
| 100 | 0.089 | 0.100 |

The mandrel for the spar is constructed so that the cross-section of the spar structure changes from rectangular to circular at approximately 22 percent of full radius. As shown in FIG. 2, a steel root sleeve 52 is attached to a flange 54 which has a series of circumferentially spaced holes (not shown) adjacent the periphery thereof and extending in a direction parallel to the axis of spar 36. A series of bolts (not shown) are used to secure flange 54 to the hub of rotor assembly 30, as is well known in the art. To reduce cost, flange 54 is preferably forged rather than casting the exterior flange/sleeve arrangement. Sleeve 52 is preferably a length of pipe which is welded to flange 54.

After spar 36 has been allowed to cure at least partially, it is trimmed to the desired length. Thereafter, the partially cured spar 36 may be incorporated directly into the assembled blade 32, as set forth in more detail hereinbelow. On the other hand, spar 36 may be allowed to cure substantially fully prior to assembly of blade 32. In that case, after the bladder has been removed, all faying surfaces to which subsequent bonding is to occur should be lightly sanded. The surfaces should also be wiped with MEK (methylethylketone) just prior to bonding.

The skin of the blade is constructed of an E-glass knit fabric. The E-glass fibers are woven into a three ply triaxial fabric which has 50% of the fiber run at 0°, 25% at +45 and 25% at −45°. Within each ply, the glass fibers lay flat and are not intertwined or woven over and under such as in a woven roving. The use of this flat lay-up makes the resulting structure stronger and stiffer than a conventional woven fabric. The skin material is preferably CDB 200 triaxial (Knytex, E-glass) having a weight of 20 ounces per square yard and a thickness of 0.025 inch per ply.

Figure 6C:
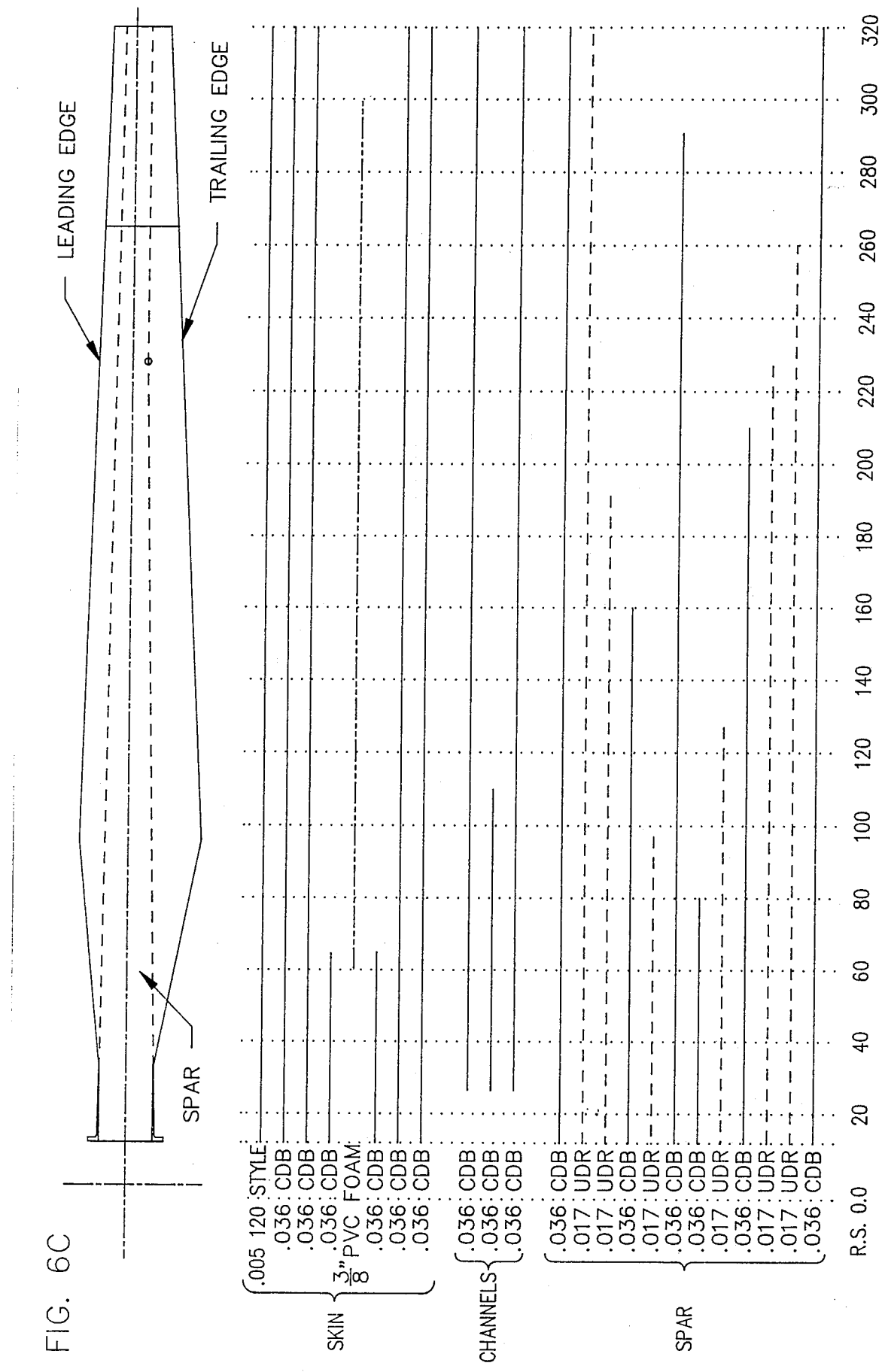

The lay-up for the skin may also include type A 130 unidirectional fabric having a weight of 14 ounces per square yard. Alternatively, instead of using CDB-200, CDB-340 type material having a weight of 34.5 ounces per square yard and a thickness per ply of 0.036 inch may also be used. The laminate schedules for the use of type CD340 material, with type UDR A130 material interspersed therein, are shown in FIG. 6C and FIG. 6D for the 8.2 meter and 9.1 meter blades, respectively. It will be understood that the particular lay-up schedule chosen for the spar, the skin and the "C" channels will depend on the type of material being used.

To obtain the required exterior skin smoothness and dimensions, female tools are preferred for the skin. Tool actuation may be accomplished by hydraulic or pneumatic actuators or hand clamps. The mold surface of the tools should be polished to 16 RMS or better.

Prior to lay-up, a polyester gel coat is sprayed on the mold surface and allowed to cure. The fabric is then impregnated with resin and layed into the tool. No splices are permitted in the skin material.

Table III sets forth the skin thickness as a function of percentage of span.

TABLE III

| Percent of Span | t Skin - (w/o stiffening inserts) | |
| --- | --- | --- |
| | 8.2M Blade | 9.1M Blade |
| 20 | 0.221 | 0.276 |
| 30 | 0.149 | 0.226 |
| 40 | 0.149 | 0.201 |
| 50 | 0.149 | 0.201 |
| 60 | 0.149 | 0.201 |
| 70 | 0.149 | 0.167 |
| 80 | 0.149 | 0.167 |
| 90 | 0.149 | 0.125 |
| 100 | 0.149 | 0.100 |

Referring to FIG. 3, the skin includes two major assemblies. A leading edge assembly 44 and trailing edge assembly 46 are joined together at upper joining regions 48 and lower joining regions 50. A single tool is used to mold leading edge assembly 44. Another tool is used to mold the trailing edge assembly 46. These tools are aligned to assemble the major components of the blades 32, as more fully described below.

Lay-up of the plies of laminate is accomplished so that selected ones of the plies extend short of the edges of the leading and trailing edge assemblies. The lay-up is such that the shape of the joining regions in the leading edge assembly 44 and the trailing edge assembly 46 are complementary. Further, the thickness in the joining regions is reduced so that the total thickness of the skin in the upper joining regions 48 is comparable to that which exists forward or aft of joining region 48 when the blade is assembled. Similarly, the thickness of the skin in joining regions 50 is comparable to that which exists forward or aft of joining regions 50, when the blade is assembled.

FIG. 8 to FIG. 12 schematically illustrate the arrangement of the plies at joining regions 48 and 50 as a function of radius for various laminate schedules. The arrangement of FIG. 8 would be used at the tip of the blade where there are few plies, while the arrangements represented in FIGS. 9 to 12 would be used for successively thicker laminates closer to the root, as for example is the case of the laminate schedule of FIG. 6B. FIGS. 8, 9 and 10 illustrate the manner in which the leading edge assembly 44 and the trailing edge assembly are joined, while FIG. 11 and FIG. 12 illustrate only leading edge assembly 46. However, a trailing edge assembly 46 in each of FIG. 11 and FIG. 12 would be formed in a manner analogous to that of the arrangements illustrated in FIGS. 8 to 10.

The plies for the leading edge and the plies for the trailing edge are fully wetout with a suitable resin prior to being placed in their respective molds. The polymer resin used is preferably a common industrial grade polyester having a service temperature of 160° F. While epoxy resin could be used to improve strength, it is more costly, and the strength provided by the use of a polyester resin is sufficient for the intended application.

When the plies making up trailing edge assembly 46 are layed up in the trailing edge mold, stiffeners 42A and 42B are placed between the appropriate plies. Any excess resin is forced from the mold.

When the leading edge assembly 44, the trailing edge assembly 46 and the spar assembly including the mandrel wrapped with the polymer impregnated, fiberglass plies have partially cured, the blade is assembled. There are six major components. These include leading edge assembly 44, trailing edge assembly 46, a foward channel 38, an aft channel 38, spar 36, and the root assembly consisting of sleeve 52 and flange 54.

The sequence of assembly of these components is as follows: first, the foward channel 38 is inserted into the leading edge assembly. The aft channel 38 is then inserted into the trailing edge assembly. The positions are approximately as shown in FIG. 3. The mandrel containing the plies of spar 36, the mold containing leading edge assembly 44 and the mold containing trailing edge assembly 46 are then aligned so that when the two molds are moved toward one another, spar 36 is captured within blade 32. Further, upper joining regions 48 and lower joining regions 50 are also aligned as illustrated in FIG. 3.

Figure 7:
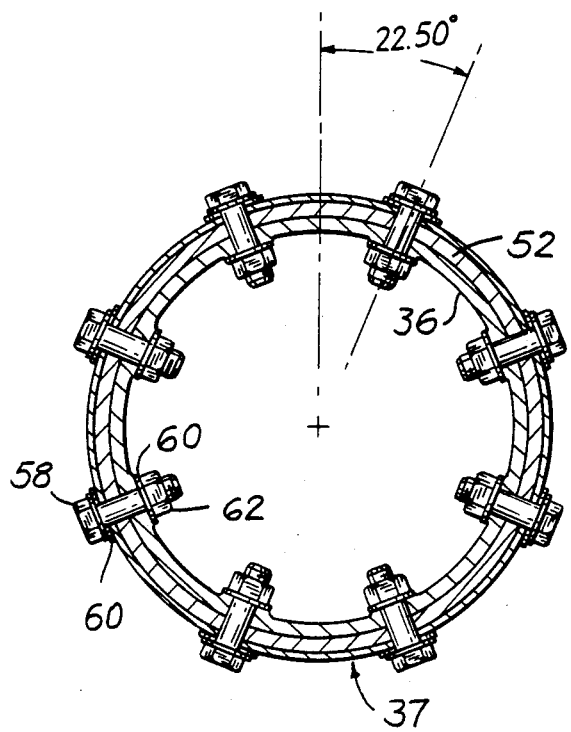
FIG. 7 is a cross-sectional view taken along line 7—7 of FIG. 2 and enlarged in scale with respect to FIG. 2.

At this point, the only additional component of the six listed components which must still be included is the root assembly of sleeve 52 and flange 54. Referring to FIG. 7, sleeve 52 is sandwiched between the cylindrical end of spar 36 and the skins of leading edge assembly 44 and trailing edge assembly 46 so that flange 54 is in contact with the innermost edge of the skins (FIG. 2). Thus, the end of spar 36 (which is circular in cross-section) is inserted into sleeve 52 and the outer surface of sleeve 52 is surrounded by the most radially inward portion of skin 37. Prior to this assembly step, a polymer such as BR 127, available from American Cyanamid, Inc., or its equivalent, is used to prime the inner and outer surfaces of sleeve 52. These surfaces are also wiped with MEK. A bonding material, which is preferably an epoxy having a service temperature of 160° F., is applied to these surfaces of sleeve 52. A high temperature curing and high glass transition temperature resin is preferred for the area in this vicinity to improve the maintenance of strength as time goes by. Since correct positioning of spar 36 rotationally with respect to sleeve 52 is critical, a bonding fixture (not shown) is utilized for this operation with notch 55 (FIG. 5A and FIG. 5B) facilitating alignment.

After this assembly step, curing is completed, generally by applying heat (or at room temperature for some resins). The leading edge and trailing edge molds are then separated and the cured assembly is then removed. The mandrel, which is tapered to facilitate removal, is then removed from the cured assembly.

A total of 24 retention bolt holes 56, arranged in three circumferential bands of eight holes each, are then drilled through the assembled spar, sleeve and skin after the bonding material has cured. These holes are finished using a reaming operation. Appropriate bolts 58, which are epoxy coated prior to installation, are installed through the holes. Again, a high temperature curing and high glass transition temperature resin is used to coat the bolts. Appropriate washers 60 are utilized internally and externally. The external washers distribute stress properly to the skin laminate, while the internal washers distribute stress properly to the spar laminate. Mating nuts 62 are installed on the bolts internally of sleeve 52 and torqued to 80 ft-lbs. Alternatively, the nuts can be placed facing the outside of the blade. This allows retorquing at long lifetimes (e.g., after ten years) if it is found that clamping action strength is declining.

The root structure attachment is designed so that the epoxy bond and bolts 58, each can independently secure the spar and skin of blade 32 to sleeve 52. Thus, there is a designed in redundancy or fail safe mechanism. If either attachment mechanism fails, the blade is still properly secured.

When the epoxy resin has cured, a tip flap of a type well known in the art is installed at the end of the blade. Generally, such mechanisms are activated by centrifugal forces and turn the tip of the blade to increase drag and prevent overspeeding during high velocity wind conditions.

To install the tip flap mechanism, the blade is cut at its tip to define an opening for receiving the mechanism. It has been found that the opening must be precisely cut so that only the narrowest of gaps is present between the mechanism and the edge of the opening in the blade that receives the mechanism. A gap as small as one sixteenth of an inch may reduce lift so that a seven percent decrease in power produced by the wind turbine is experienced. If a gap is present, steps should be taken to seal the gap, with a suitable tape or sealant.

Various modifications of the invention will occur to those skilled in the art. For example, S glass material, rather than E glass material may be used. The use of S glass material has the advantage of providing increased strength of the rotor blade. However, the cost of the blade is also increased In addition, it will be understood that while the twist of the blade of the present invention is not greater than 8° and in the preferred embodiments is 5°, the twist may be varied as permitted by the strength of the remainder of the turbine structure.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

TABLE IA

LS(1)-0413 AIRFOIL DESIGN COORDINATES

| $x/c$ | $(z/c)_{upper}$ | $(z/c)_{lower}$ |
|---|---|---|
| 0.0 | 0.0 | 0.0 |
| .0020 | .01035 | −.00495 |
| .0050 | .01588 | −.00935 |
| .0125 | .02424 | −.01448 |
| .0250 | .03325 | −.01907 |
| .0375 | .03966 | −.02226 |
| .0500 | .04476 | −.02498 |
| .0750 | .05261 | −.02938 |
| .1000 | .05862 | −.03281 |
| .1250 | .06347 | −.03562 |
| .1500 | .06755 | −.03792 |
| .1750 | .07103 | −.03982 |
| .2000 | .07399 | −.04139 |
| .2500 | .07861 | −.04368 |
| .3000 | .08182 | −.04484 |
| .3500 | .08381 | −.04516 |
| .4000 | .08464 | −.04474 |

TABLE IA-continued

LS(1)-0413 AIRFOIL DESIGN COORDINATES

| $x/c$ | $(z/c)_{upper}$ | $(z/c)_{lower}$ |
|---|---|---|
| .4500 | .08435 | −.04353 |
| .5000 | .08293 | −.04144 |
| .5500 | .08023 | −.03810 |
| .5750 | .07834 | −.03589 |
| .6000 | .07605 | −.03334 |
| .6250 | .07335 | −.03051 |
| .6500 | .07024 | −.02745 |
| .6750 | .06674 | −.02425 |
| .7000 | .06287 | −.02097 |
| .7250 | .05868 | −.01767 |
| .7500 | .05419 | −.01441 |
| .7750 | .04946 | −.01126 |
| .8000 | .04450 | −.00831 |
| .8250 | .03933 | −.00568 |
| .8500 | .03397 | −.00347 |
| .8750 | .02843 | −.00181 |
| .9000 | .02275 | −.00080 |
| .9250 | .01692 | −.00058 |
| .9500 | .01096 | −.00135 |
| .9750 | .00483 | −.00336 |
| 1.0000 | −.00156 | −.00714 |

TABLE IB

LS(1)-0417 AIRFOIL DESIGN COORDINATES

| $x/c$ | $(z/c)_{upper}$ | $(z/c)_{lower}$ |
|---|---|---|
| 0.0 | 0.0 | 0.0 |
| .0020 | .01300 | −.00974 |
| .0050 | .02035 | −.01444 |
| .0125 | .03069 | −.02051 |
| .0250 | .04165 | −.02691 |
| .0375 | .04974 | −.03191 |
| .0500 | .05600 | −.03569 |
| .0750 | .06561 | −.04209 |
| .1000 | .07309 | −.04700 |
| .1250 | .07909 | −.05087 |
| .1500 | .08413 | −.05426 |
| .1750 | .08849 | −.05700 |
| .2000 | .09209 | −.05926 |
| .2500 | .09778 | −.06265 |
| .3000 | .10169 | −.06448 |
| .3500 | .10409 | −.06517 |
| .4000 | .10500 | −.06483 |
| .4500 | .10456 | −.06344 |
| .5000 | .10269 | −.06091 |
| .5500 | .09917 | −.05683 |
| .5750 | .09674 | −.05396 |
| .6000 | .09374 | −.05061 |
| .6250 | .09013 | −.04678 |
| .6500 | .08604 | −.04265 |
| .6750 | .08144 | −.03830 |
| .7000 | .07639 | −.03383 |
| .7250 | .07096 | −.02930 |
| .7500 | .06517 | −.02461 |
| .7750 | .05913 | −.02030 |
| .8000 | .05291 | −.01587 |
| .8250 | .04644 | −.01191 |
| .8500 | .03983 | −.00852 |
| .8750 | .03313 | −.00565 |
| .9000 | .02639 | −.00352 |
| .9250 | .01965 | −.00248 |
| .9500 | .01287 | −.00257 |
| .9750 | .00604 | −.00396 |
| 1.0000 | −.00074 | −.00783 |

TABLE IC

LS(1)-0421 AIRFOIL DESIGN COORDINATES

| $x/c$ | $(z/c)_{upper}$ | $(z/c)_{lower}$ |
|---|---|---|
| 0.0 | 0.0 | 0.0 |
| .0020 | .01560 | −.01071 |
| .0050 | .02377 | −.01775 |
| .0125 | .03599 | −.02653 |
| .0250 | .04912 | −.03522 |
| .0375 | .05853 | −.04137 |
| .0500 | .06606 | −.04650 |

TABLE IC-continued

LS(1)-0421 AIRFOIL DESIGN COORDINATES

| x/c | $(z/c)_{upper}$ | $(z/c)_{lower}$ |
| --- | --- | --- |
| .0750 | .07771 | −.05463 |
| .1000 | .08664 | −.06097 |
| .1250 | .09388 | −.06612 |
| .1500 | .09993 | −.07038 |
| .1750 | .10507 | −.07393 |
| .2000 | .10943 | −.07690 |
| .2500 | .11617 | −.08130 |
| .3000 | .12074 | −.08381 |
| .3500 | .12344 | −.08484 |
| .4000 | .12439 | −.08455 |
| .4500 | .12365 | −.08288 |
| .5000 | .12112 | −.07970 |
| .5500 | .11657 | −.07452 |
| .5750 | .11342 | −.07104 |
| .6000 | .10965 | −.06701 |
| .6250 | .10525 | −.06247 |
| .6500 | .10025 | −.05752 |
| .6750 | .09470 | −.05226 |
| .7000 | .08865 | −.04678 |
| .7250 | .08216 | −.04117 |
| .7500 | .07530 | −.03553 |
| .7750 | .06814 | −.02994 |
| .8000 | .06075 | −.02456 |
| .8250 | .05318 | −.01953 |
| .8500 | .04550 | −.01500 |
| .8750 | .03775 | −.01112 |
| .9000 | .03000 | −.00805 |
| .9250 | .02232 | −.00598 |
| .9500 | .01476 | −.00515 |
| .9750 | .00735 | −.00589 |
| 1.0000 | .00016 | −.00886 |

We claim:

1. A wind turbine rotor blade including NASA LS(1)-04xx airfoil sections, said wind turbine blade having:
   a thickness-to-chord ratio of substantially sixteen percent at full radius, said thickness-to-chord ratio increasing to substantially nineteen percent at one half full radius and substantially twenty nine percent at three-tenths full radius; and
   a twist equal to zero from full radius to fifty percent full radius, said twist varying to a value no greater than eight degrees at a theoretical hub of the rotor blade.

2. The wind turbine rotor blade of claim 1, wherein said thickness-to-chord ratio at three-tenths full radius is 29.4 percent.

3. The wind turbine rotor blade of claim 1, wherein blade thickness increases linearly between full radius and one-half full radius.

4. The wind turbine rotor blade of claim 1, wherein blade thickness increases linearly between one-half full radius and three-tenths full radius.

5. The wind turbine rotor blade of claim 1, wherein at forty percent chord, the thickness of said blade is maximum.

6. The wind turbine rotor blade of claim 1, having a substantially linear leading edge and a substantially linear trailing edge.

7. The wind turbine rotor blade of claim 1, wherein the twist increases linearly from fifty percent of full radius to the theoretical hub.

8. The wind turbine rotor blade of claim 1, further comprising a root end and a root-to-hub connection fixture having a circular cross-section and extending longitudinally in said blade at said root end, and wherein between three-tenths full radius and the root-to-hub connection fixture, the cross-sectional shape of the rotor blade changes from an airfoil section to a circular cross-section corresponding to that of said root-to-hub connection fixture.

9. The wind turbine rotor blade of claim 1, having a theoretical length of substantially 8.17 meters, and a chord length increasing from substantially 0.406 meters at full radius to a theoretical value of 1.065 meters at the theoretical hub.

10. The wind turbine rotor blade of claim 9, wherein said chord length increases linearly from full radius to the theoretical hub.

11. The wind turbine rotor blade of claim 9, wherein said chord length increases linearly from full radius to three-tenths full radius, and decreases from three-tenths full radius toward the theoretical hub.

12. The wind turbine rotor blade of claim 9, further comprising a root end and wherein between three-tenths of full radius and the root end, a cross-sectional shape of the rotor blade changes from an airfoil section to a circular cross-section.

13. The wind turbine rotor blade of claim 1, having a theoretical length of substantially 9.10 meters, and a chord length increasing from substantially 0.40 meters at full radius to a theoretical value of 0.97 meters at the theoretical hub.

14. The wind turbine rotor blade of claim 13, wherein said chord length increases linearly from full radius to the theoretical hub.

15. The wind turbine rotor blade of claim 13, wherein said chord length increases linearly from full radius to three-tenths full radius, and decreases from three-tenths full radius to the theoretical hub.

16. The wind turbine rotor blade of claim 13, further comprising a root end and wherein between three-tenths of full radius and the root end, a cross-sectional shape of the rotor blade changes from an airfoil section to a circular cross-section.

17. The wind turbine rotor blade of claim 1 having an outer skin of fiberglass plies impregnated with polymer resin, said rotor blade comprising:
   a spar of fiberglass plies impregnated with polymer resin extending longitudinally within said rotor blade, said spar having a substantially rectangular cross section, said spar having a first wall affixed to a first inner surface of said skin and a second wall affixed to a second inner surface of said skin, a third wall and a fourth wall, said third wall and said fourth wall extending substantially perpendicularly to said inner surfaces of said skin from said first wall to said second wall, p1 a first channel of fiberglass plies impregnated with polymer resin extending longitudinally within said rotor blade, said first channel having a first wall extending parallel to said third wall of said spar and affixed thereto, a second wall extending parallel to said first inner surface of said skin and affixed thereto, and a third wall extending parallel to said second inner surface of said skin and affixed thereto, said second wall and said third wall extending away from said spar, and
   a second channel of fiberglass plies impregnated with polymer resin extending longitudinally within said rotor blade, said second channel having a first wall extending parallel to said fourth wall of said spar and affixed thereto, a second wall extending parallel to said first inner surface of said skin and affixed thereto, and a third wall extending parallel to said second inner surface of said skin and affixed thereto, said second wall and said third wall extending away from said spar.

18. The wind turbine rotor blade of claim 17, wherein said first channel and said second channel have only respective first walls, second walls and third walls, said first channel being disposed between the leading edge of said rotor blade and said spar, said first channel being open towards said leading edge; and said second channel being disposed between the trailing edge and said spar, said second channel being open towards said trailing edge.

19. The wind turbine rotor blade of claim 17, wherein said spar, said first channel and said second channel are shaped to define regions having a cusp shaped cross-section, said regions being bounded by said spar, one of said channels and an inner surface of said skin, and said regions extending along the span of said blade.

20. The wind turbine rotor blade of claim 19, wherein said cusp shaped regions are filled with said polymer resin.

21. The wind turbine rotor blade of claim 17, further comprising a third channel, said third channel having a first wall disposed between said spar and said trailing edge, a second wall extending along said first inner surface of said skin and a third wall extending along said second inner surface of said skin, said first wall of said third channel connecting said second wall of said third channel and said third wall of said channel.

22. The wind turbine rotor blade of claim 21, wherein said third channel has a cross-section which is substantially "C" shaped.

23. The wind turbine rotor blade of claim 22, wherein said third channel opens toward the leading edge of said rotor blade.

24. The wind turbine rotor blade of claim 21, further comprising a stiffening material disposed inside said rotor blade between said third channel and the trailing edge of said rotor blade.

25. The wind turbine rotor blade of claim 24, wherein said stiffening material is formed of a polymer resin.

26. The wind turbine rotor blade of line 17, further comprising a plurality of polymer foam stiffening inserts extending longitudinally within the trailing edge of the rotor blade.

27. The wind turbine rotor blade of claim 26, wherein each of said plurality of stiffening inserts is disposed between two plies of a trailing edge portion of said outer skin, said plies being separated to define a respective channel for receiving each one of said plurality of stiffening inserts.

28. The wind turbine rotor blade of claim 26, wherein a first stiffening insert of said plurality of stiffening inserts is disposed so as to stiffen a first wall of said trailing edge, and a second stiffening insert of said plurality of stiffening inserts is disposed so as to stiffen a second wall of said trailing edge.

29. The wind turbine rotor blade of claim 1 comprising:
a leading edge assembly including layers of fiberglass impregnated with a polymer resin, said leading edge assembly having a closed leading edge and rear edges defining an open rear, several of said layers extending short of said rear edges so that a thickness of said leading edge assembly is reduced in first attachment regions adjacent said rear edges, and
a trailing edge assembly including layers of fiberglass impregnated by a polymer resin, said trailing edge assembly having a closed trailing edge and front edges defining an open front, several of said layers extending short of said front edges so that a thickness of said trailing edge assembly is reduced in second attachment regions adjacent said front edges,
said first attachment regions and said second attachment regions being of substantially complementary shape, said first attachment regions being of a thickness sufficient to receive the reduced thickness of said second attachment regions, and
a spar extending longitudinally of said turbine blade, said spar having a rectangular cross section, a first wall of said spar being affixed in direct and continuous contact with inner surfaces of said leading edge assembly and said trailing edge assembly so as to span upper ones of said attachment regions, and a second wall of said spar being affixed in direct and continuous contact with inner surfaces of said leading edge assembly and said trailing edge assembly so as to span lower ones of said attachment regions.

30. The wind turbine rotor blade of claim 29, wherein inner ones of said layers of said leading edge assembly extend short of said rear edges, and wherein outer ones of said layers of said trailing edge assembly extend short of said front edges.

31. The wind turbine rotor blade of claim 29, further comprising a plurality of polymer foam stiffening inserts extending longitudinally within said trailing edge assembly.

32. The wind turbine rotor blade of claim 31, wherein each of said plurality of stiffening inserts is disposed between two layers of said trailing edge assembly, said two layers being separated to define a respective channel for receiving one of said plurality of stiffening inserts.

33. The wind turbine rotor blade of claim 31, wherein a first stiffening insert of said plurality of stiffening inserts is disposed so as to stiffen a first wall of said trailing edge assembly and a second stiffening insert of said plurality of stiffening inserts is disposed so as to stiffen a second wall of said trailing edge assembly.

34. The wind turbine rotor blade of claim 29, further comprising:
a first channel extending longitudinally within said rotor blade, said first channel having a first wall extending parallel to said third wall of said spar and affixed thereto, a second wall extending parallel to said first inner surface of said skin and affixed thereto, and a third wall extending parallel to said second inner surface of said skin and affixed thereto, said second wall and said third wall extending away from said spar, and
a second channel extending longitudinally within said rotor blade, and said second channel having a first wall extending parallel to said fourth wall of said spar and affixed thereto, a second wall extending parallel to said first inner surface of said skin and affixed thereto, and a third wall extending parallel to said second inner surface of said skin and affixed thereto, said second wall and said third wall extending away from said spar.

35. The wind turbine rotor blade of claim 34, wherein said first channel and said second channel have only respective first walls, second walls and third walls, said first channel being disposed between the leading edge of said rotor blade and said spar, said first channel being open towards said leading edge, and said second channel being disposed between the trailing edge and said spar, said second channel being open towards said trailing edge.

36. The wind turbine rotor blade of claim 34, wherein said spar, said first channel and said second channel are shaped to define regions having a cusp shaped cross-section, said regions being bounded by said spar, one of said channels and an inner surface of said skin, and said cusp shaped regions extending along the span of said blade.

37. The wind turbine rotor blade of claim 36, wherein said cusp shaped regions are filled with said polymer resin.

38. The wind turbine rotor blade of claim 34, further comprising a third channel, said third channel having a first wall disposed between said spar and said trailing edge, a second wall extending along said first inner surface of said skin and a third wall extending along said second inner surface of said skin, said first wall of said third channel connecting said second wall of said third channel and said third wall of said channel.

39. The wind turbine rotor blade of claim 38, wherein said third channel has a cross-section which is substantially "C" shaped.

40. The wind turbine rotor blade of claim 39, wherein said third channel opens toward a leading edge of said rotor blade.

41. The wind turbine rotor blade of claim 38, further comprising a stiffening material disposed inside said rotor blade between said third channel and the trailing edge of said rotor blade.

42. The wind turbine rotor blade of claim 41, wherein said stiffening material is formed of a polymer resin.

43. The wind turbine rotor blade of claim 34, wherein said first channel and said second channel are comprised of fiberglass plies impregnated with a polymer resin.

44. The wind turbine rotor blade of claim 29, wherein said spar is comprised of fiberglass plies impregnated with a polymer resin.

45. A wind turbine rotor blade having an outer skin of fiberglass plies impregnated with polymer resin, said rotor blade comprising:
a spar extending longitudinally within said rotor blade, said spar having a substantially rectangular cross-section, said spar having a first wall affixed to a first inner surface of said skin and a second wall affixed to a second inner surface of said skin, a third wall and a fourth wall, said third and fourth walls extending substantially perpendicularly to said inner surfaces of said skin from said first wall to said second wall;
a first channel extending longitudinally within said rotor blade, said first channel having a first wall extending parallel to said third wall of said spar and affixed thereto, a second wall extending parallel to said first inner surface of said skin and affixed thereto, and a third wall extending parallel to said second inner surface of said skin and affixed thereto, said second wall and said third wall extending away from said spar;
a second channel extending longitudinally within said rotor blade, said first channel having a first wall extending parallel to said fourth wall of said spar and affixed thereto, a second wall extending parallel to said first inner surface of said skin and affixed thereto, and a third wall extending parallel to said second inner surface of said skin and affixed thereto, said second wall and said third wall extending away from said spar;
a leading edge assembly formed of said plies of fiberglass, said leading edge assembly having a closed leading edge and rear edges defining an open rear, several of said layers extending short of said rear edges so that a thickness of said leading edge assembly is reduced in first attachment regions adjacent said rear edges;
a trailing edge assembly formed of said plies of fiberglass, said trailing edge assembly having a closed trailing edge and front edges defining an open front, several of said layers extending short of said front edges so that a thickness of said trailing edge assembly is reduced in second attachment regions adjacent said front edges;
said first attachment regions and said second attachment regions being of substantially complementary shape, said first attachment regions being of a thickness sufficient to receive the reduced thickness of said second attachment regions; said rotor blade also having:
a thickness-to-chord ratio of substantially sixteen percent at full radius, said thickness increasing to substantially nineteen percent at one half full radius and substantially twenty nine percent at three-tenths full radius; and
a twist equal to zero from full radius to fifty percent full radius, said twist varying to a value no greater than eight degrees at a theoretical hub of the rotor blade.

46. A wind turbine rotor blade comprising:
a first portion formed of fiberglass reinforced polymer resin, said first portion having a first part shaped as an airfoil and an end shaped as a cylinder;
a second portion formed of a metal, said second portion being adapted for coupling said blade to a rotor hub, said second portion having a cylindrical sleeve which engages said end so that at least a first circumferential surface of said sleeve contacts a second circumferential surface of said end;
a polymer primer disposed on said first circumferential surface;
an adhesive disposed between said primer on said first circumferential surface and said second circumferential surface; and
at least one mechanical fastener for fastening said end to said sleeve.

47. The wind turbine rotor of claim 46, wherein said at least one mechanical fastener comprises a plurality of fasteners extending radially through said end and said sleeve.

48. The wind turbine rotor blade of claim 46, wherein said first portion includes an outer skin and a spar extending longitudinally within said skin, said skin and said spar having concentric circular cross sections at said end, an inner surface of said skin being in contact with an outer surface of said sleeve, and an outer surface of said spar being in contact with an inner surface of said sleeve; and said adhesive and said polymer primer being disposed between said inner surface of said skin and said outer surface of said sleeve, and between said outer surface of said spar and said inner surface of said sleeve.

49. A wind turbine rotor blade comprising:
a first portion formed of fiberglass reinforced polymer resin, said first portion having a first part shaped as an airfoil and an end shaped as a cylinder;

a second portion formed of a metal, said second portion being adapted for coupling said blade to a rotor hub, said second portion having a cylindrical sleeve which engages said end so that at least a first circumferential surface of said end;

an adhesive disposed between said first circumferential surface and said second circumferential surface; and at least one mechanical fastener for fastening said end to said sleeve;

wherein said first portion includes an outer skin and a spar extending longitudinally within said skin, said skin and said spar having concentric circular cross sections at said end, an inner surface of said skin being in contact with an outer surface of said sleeve, and an outer surface of said spar being in contact with an inner surface of said sleeve; and said adhesive being disposed between said inner surface of said skin and said outer surface of said sleeve, and between said outer surface of said spar and said inner surface of said sleeve.

* * * * *